United States Patent [19]

Spinnato et al.

[11] Patent Number: 5,252,087
[45] Date of Patent: Oct. 12, 1993

[54] POLYGONAL SECTION CONNECTOR COMPRISING TWO CONNECTOR PORTIONS THAT ARE AUTOMATICALLY POSITIONABLE RELATIVE TO EACH OTHER DURING COUPLING

[75] Inventors: Gilbert Spinnato, Guyancourt; Yves Dohan, Paris, both of France

[73] Assignee: Souriau et Cie, Versailles, France

[21] Appl. No.: 992,015

[22] Filed: Dec. 17, 1992

[30] Foreign Application Priority Data

Dec. 17, 1991 [FR] France ............................ 91 15646

[51] Int. Cl.⁵ .................................... H01R 13/00
[52] U.S. Cl. .......................................... 439/247
[58] Field of Search .......................... 439/246-252

[56] References Cited

U.S. PATENT DOCUMENTS

| | | | |
|---|---|---|---|
| 3,094,364 | 6/1963 | Lingg | 439/247 |
| 4,909,748 | 3/1990 | Kozono et al. | |
| 4,954,094 | 9/1990 | Humphrey | 439/247 |
| 4,998,889 | 3/1991 | Moly | 439/247 |

FOREIGN PATENT DOCUMENTS

| | | |
|---|---|---|
| 0182065 | 5/1986 | European Pat. Off. |
| 0349134 | 1/1990 | European Pat. Off. |
| 0371835 | 6/1990 | European Pat. Off. |
| 3903839 | 8/1989 | Fed. Rep. of Germany |

OTHER PUBLICATIONS

"SLT Connector Guide for Power Supply Insertion" IBM Technical Disclosure Bulletin-vol. 25 No. 7B--Dec. 1982.

*Primary Examiner*—Joseph H. McGlynn
*Attorney, Agent, or Firm*—Pollock, Vande Sande & Priddy

[57] ABSTRACT

A polygonal section connector comprises a male portion (1) and a female portion (9) that are suitable for coupling together, each supported by a respective support, with at least one of said portions being supported in floating manner. The female portion and/or the male portion is/are provided with alignment means (7, 16; 8, 17) for aligning the male portion in the female portion. One of the connector portions is fitted with centering means for centering it relative to the other portion, which means are suitable for prepositioning said portion, even when presented with an offset and/or an inclination relative to the other portion. The alignment means comprise prealignment means for prealigning the male portion in the female portion and including a skirt (12) which is polygonal in section and designed to receive the male portion as precentered by the centering means. The skirt (12) and the male portion (1) are provided with complementary reliefs (7, 16) for prealigning the male portion in the skirt (12).

12 Claims, 9 Drawing Sheets

POLYGONAL SECTION CONNECTOR COMPRISING TWO CONNECTOR PORTIONS THAT ARE AUTOMATICALLY POSITIONABLE RELATIVE TO EACH OTHER DURING COUPLING

The present invention relates to improvements to polygonal section connectors comprising a first or male connector portion and a second or female connector portion, which portions can be releasably coupled to each other to establish a continuous link; said male and female portions being supported by respective supports, with at least one of said connector portions being connected to its support via a floating mount; the connector portions being capable of being coupled together by moving their respective supports along a direction approximately parallel to the coupling direction of the two portions, and the female portion and/or the male portion being provided with alignment means for aligning the male portion in the female portion; one of the connector portions being fitted with centering means for centering it relative to the other portion, which means are suitable for prepositioning said portion even if it is presented with an offset and/or with an inclination relative to the other portion.

The invention applies to electrical connectors and/or to fluid connectors (hydraulic or pneumatic) disposed to establish continuity between two electrical lines or two fluid lines, as the case may be.

The invention applies in particular to cases where the two connector portions are coupled together by moving their respective supports, even though said supports may, in particular because of normally-accepted clearances, occupy relative positions such that the two connector portions are presented to each other in a misaligned configuration (mutual inclination and/or transverse offset).

Such circumstances occur, for example, in remotely-controlled robots, either because the two connector portions are coupled together by automatic or remotely-controlled robot-type arms, or else because said coupling is obtained during docking of the respective supports of the connector portions.

The invention therefore seeks to provide means making it possible to ensure that the two connector portions couple properly under all circumstances, even when they are mutually offset and/or inclined on presentation.

To this end, a connector of the above-specified type, when in accordance with the invention is essentially characterized in that said alignment means comprise prealignment means for prealigning the male portion in the female portion and comprising a skirt which is polygonal in section and which is designed to receive the male portion precentered by said centering means, said skirt and the male portion being fitted with complementary prealignment reliefs for prealigning the male portion in said skirt.

Because of the relative mobility of at least one of the portions and because of the at least two positioning levels imparted by the special structure adopted for the female portion, it is certain that the male and female portions can be completely and effectively coupled together without damaging their electrical contacts or the structures of the connector portions.

In addition, the prealignment phase may extend over a relatively short axial distance by selecting appropriate means such as those mentioned below and no significant increase in the axial length of the female connector portion results therefrom.

In a simple embodiment, the complementary prealignment reliefs are provided on co-operating faces of the skirt and of the male portion, and comprise keys and grooves of complementary shapes; advantageously, in order to obtain proper prealignment using a minimum of means, and above all to reduce the axial extent of said means, complementary prealignment reliefs are provided on the co-operating large faces of the skirt and of the male portion when the section thereof is rectangularly shaped.

It is also desirable for the alignment means further to comprise means for providing fine alignment of the male portion in the female portion and including, downstream from the complementary prealignment reliefs, complementary fine alignment guidance reliefs for the male portion in said skirt.

Still for the purpose of obtaining an embodiment that is simple, the complementary fine alignment guidance reliefs are provided on co-operating faces of the skirt and of the male portion and comprise keys and grooves of complementary shapes, the axial profile of the keys or the grooves varying, with at least one ramp suitable for passing from prealignment guidance to fine alignment guidance of the male portion in the female portion. In order to reduce the stroke required for obtaining fine alignment, it is desirable for the fine alignment guidance reliefs to be provided over the entire co-operating faces of the skirt and of the male portion.

To facilitate bringing the prealignment means into proper co-operation, it is necessary for the male and female portions to be brought into mutual alignment whenever they are presented face to face in a misaligned configuration. To this end, it is advantageous in combination with the above dispositions to provide for the female portion to be fitted with the above-mentioned centering means for centering the male portion, which means comprise another skirt that flares forwardly with an axial profile suitable for prepositioning said male portion when presented to the female portion with an offset and/or an inclination. Advantageously, the flared skirt is discontinuous and is made up of flared skirt lengths situated at the corners of the female portion. In particular, in the common circumstances of a connector having a section in the form of a rectangle, it is possible to provide for the angular extent of each of the flared skirt lengths to be about 90°. By omitting the portions of the flared skirt that are not required to have any functional effect, the female connector portion can be made lighter in weight and it becomes easier to make the flared skirt in special shapes that may possibly be complex. In particular, these lengths of flared skirt may be rectilinear or curved in profile, and if curved they may have curvature that is continuous or variable, the appropriate profile being determined so as to obtain the desired centering of the male portion as a function of the forces urging the portions together and of the acceptable limits on initial mutual inclination and/or offset.

To reduce the risk which is inherent to the polygonal shape of the male and female portions of the male portion jamming during penetration into the female portion and also to reduce friction between the male portion and the flared skirt of the female portion during centering, it is desirable for the corners of the male and female portions to be rounded.

Still for the purpose of reducing the risks of the male portion jamming in the female portion, it is also desirable for one or both of the male and female portions to be mounted in floating manner on its respective support so that together they have at least two degrees of freedom in translation and at least two degrees of freedom in rotation relative to their supports.

Finally, to facilitate centering of the male portion relative to the female portion, provision may be made for the frictional portions of the inclined surface of one connector portion and of the other connector portion to be made of a material having a low coefficient of friction, or to be provided with a coating of such a material.

The invention will be better understood on reading the following description of a preferred embodiment given solely by way of non-limiting example; the description refers to the accompanying drawings, in which.

Figure 1:
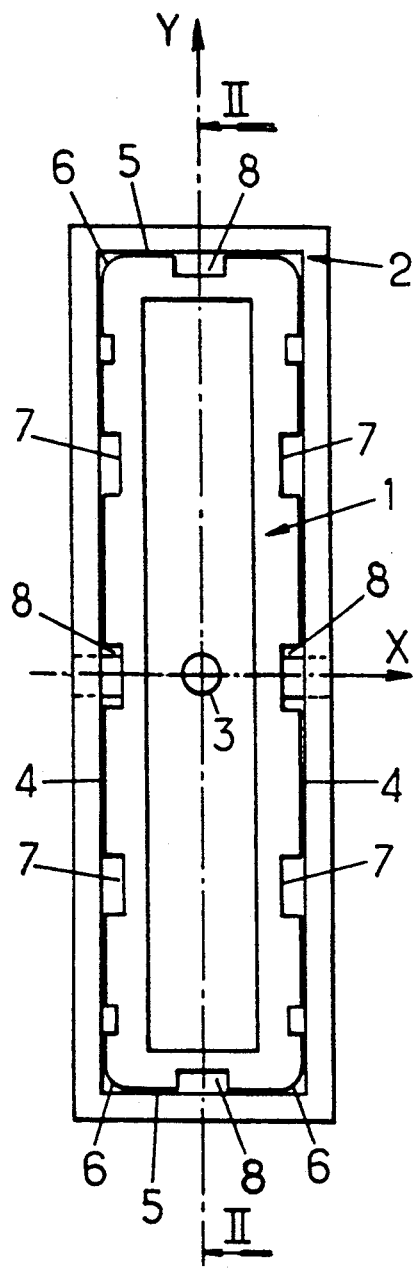
FIGS. 1 and 2 are views of a male connector portion shown respectively from above and as a side view in section on line II—II of FIG. 1.
Figure 2:
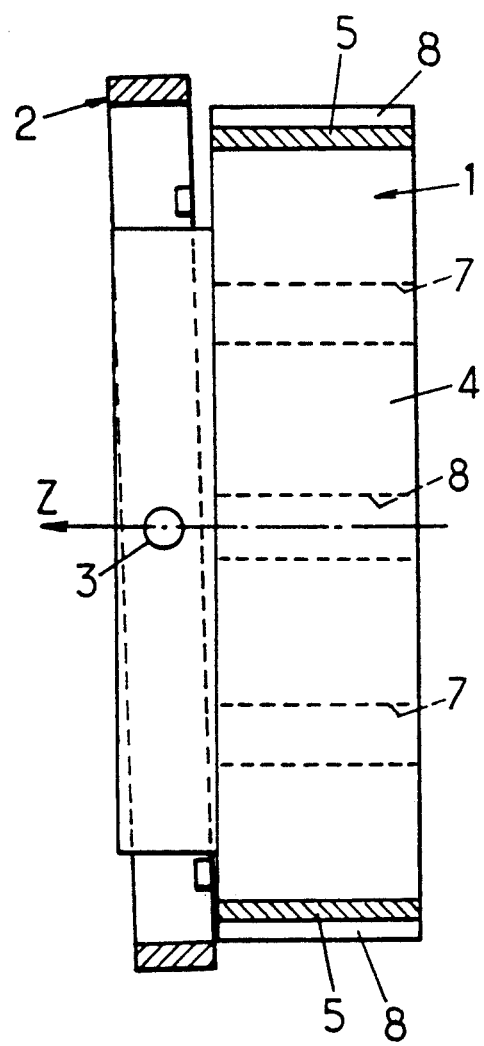

With reference initially to FIGS. 1 and 2, a male connector portion 1 (which by way of example is rectangular in section and is represented in the drawings merely by its housing, for reasons of clarity) is mounted in floating manner on a support 2.

The means suitable for securing the connector portion 1 in floating manner must be capable of giving it several degrees of freedom in translation and/or rotation relative to the support 2. Advantageously, they provide at least four degrees of freedom, namely at least two degrees of freedom in translation along X and Y axes, and at least two degrees of freedom in rotation about said X and Y axes. They preferably provide six degrees of freedom, namely three degrees of freedom in translation along X, Y, and Z axes and three degrees of freedom in rotation about said X, Y, and Z axes. Using the convention adopted in FIGS. 1 and 2, the X axis is perpendicular to the long side 4 of the male portion 1, the Y axis is perpendicular to the short side 5, and the Z axis (the axial direction of the connector) is perpendicular to the X and Y axes and corresponds approximately to the direction F for coupling with the female portion.

The means in question may be disposed in any appropriate manner known to the person skilled in the art and are not taken into consideration, per se, in the context of the present invention. To simplify, they are represented schematically in FIGS. 1 and 2 by an element 3 located at the point of intersection of the axes X, Y, and Z.

The corners 6 between the outside faces of the male portion 1 are rounded. The outside faces are provided with axial grooves (parallel to the Z-axis) as follows: each of the large faces 4 is provided with two prealignment grooves 7 disposed symmetrically on either side of the plane defined by the X-axis and the Z-axis, while each of the two large faces 4 and the two small faces 5 is provided with a fine alignment groove 8 in a central position.

Figures 3, 4:
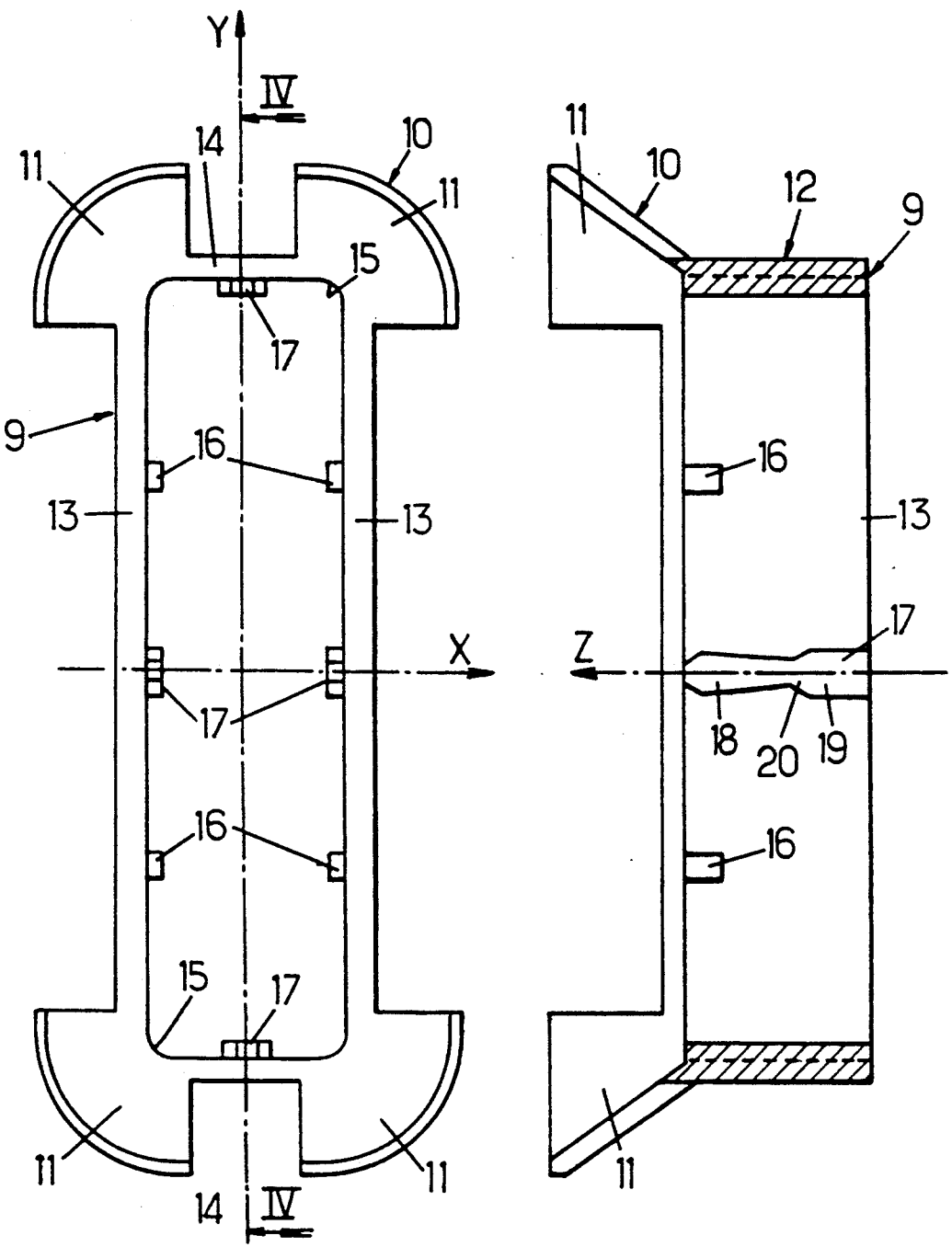
FIGS. 3 and 4 are views of a female connector portion shown respectively from above and as a side view in section on line IV—IV of FIG. 3.

With reference now to FIGS. 3 and 4, a female connector portion 9 of section complementary to the male portion 1 (in this case a rectangular section, with only the housing of the female connector portion being shown in order to clarify the drawing) is shaped in complementary manner to the male portion 1 so as to enable the male portion to penetrate therein and establish connections between two lines to be connected together. By way of non-limited example, these lines may be two electrical lines (not shown).

The female portion 9 is provided with a front skirt 10 that flares forwards and that projects forwards. This skirt fits over the rectangular outline of the female portion and has rounded corners. As explained below, only the corners of the skirt 10 are functionally useful and it is possible for the skirt 10 to be made in discontinuous form by omitting its flats that extend along the sides of the female portion 9, so that only the corners 11 remain. Each corner then extends over about 90°. Not only does this reduce the weight of the female portion, but it is also easier to give an appropriate profile to the corners 11, which profile may be complex. In FIG. 4, each corners 11 of the skirt is shown as having a rectilinear profile, however it is also possible to use curved profiles, e.g. a circular profile (in which case each corner corresponds to approximately one-eighth of a sphere). It is also possible to use profiles of varying curvature so as to modulate the guidance provided for the male portion.

The flared skirt 10 is connected to a second skirt 12 of rectangular section and having parallel walls which, in practice, constitute or extend the housing of the female portion 9. The second skirt 12 has large walls 13 and small walls 14 which are connected together via rounded corners 15 having the same radius as the corners 6 of the male portion 1.

The inside faces of the large walls 13 are provided with prealignment keys or ribs 16 which are disposed symmetrically about the plane defined by the X-axis and the Z-axis and which are shaped to co-operate with the prealignment grooves 7 of the male portion. The inside faces of the large walls 3 and of the small walls 4 are also provided with fine alignment keys or ribs 17 which are disposed in centered positions on the walls and which are shaped to co-operate with the alignment grooves 8 of the male portion.

In addition, each alignment key or rib 17 is of varying longitudinal profile having a relatively narrow front end 18 and a relatively wide rear end 19 having the same width as the alignment groove 8 of the male portion, there being an intermediate cam-forming length 20 of varying width interconnecting the ends.

The method of coupling the male portion 1 to the female portion 9 is described below with reference to FIGS. 5 to 11.

Figure 5:
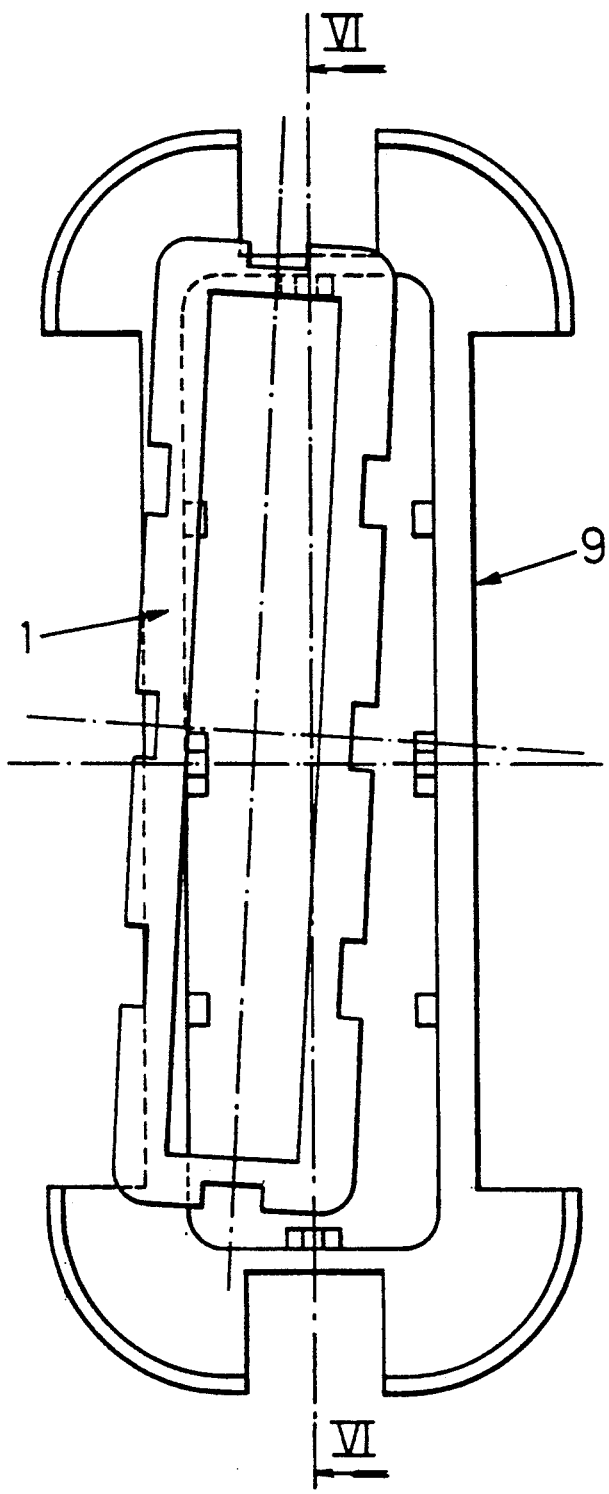
FIGS. 5 and 6 show the male portion being centered relative to the female portion, respectively as seen from above and as a side view in section on line VI—VI of FIG. 5.
Figure 6:
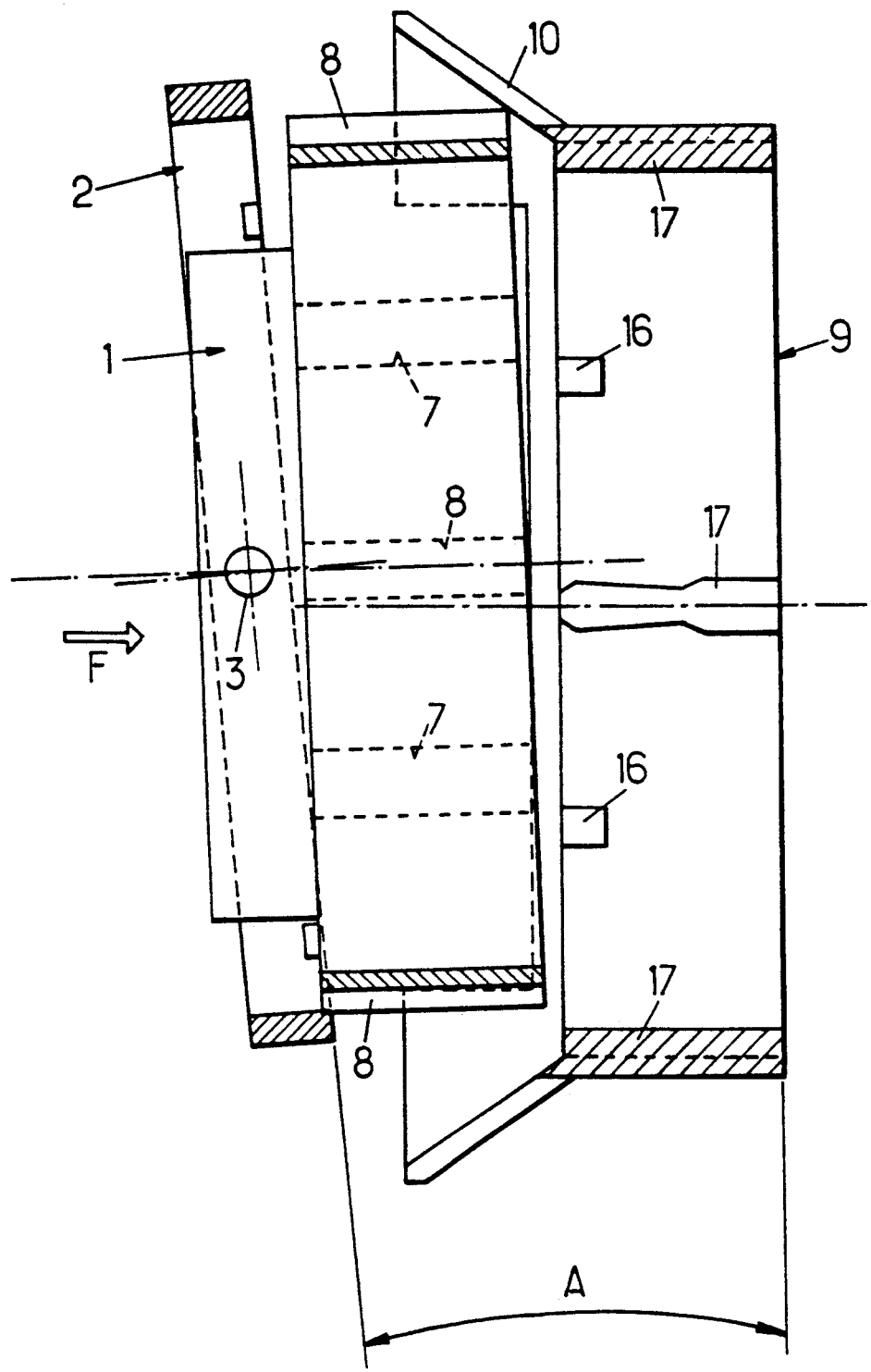

As shown in FIGS. 5 and 6, the male portion 1 is assumed to be presented in front of the female portion 9 while being offset transversely relative thereto (see FIG. 5) and while also being inclined relative thereto (the support 2 of the male portion being at an angle A relative to the support plane of the female portion 9).

Figure 7:
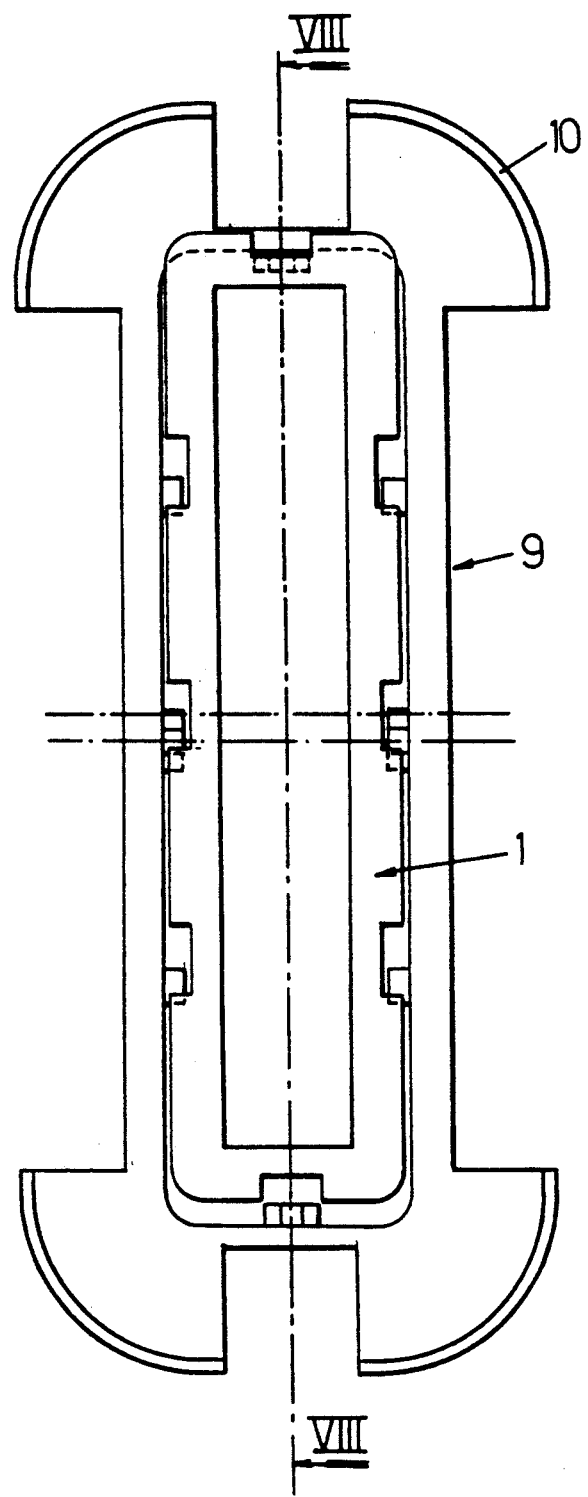
FIGS. 7 and 8 show the end of the male portion being centered relative to the female portion, respectively as seen from above and as a side view in section on line VIII—VIII of FIG. 7.
Figure 8:
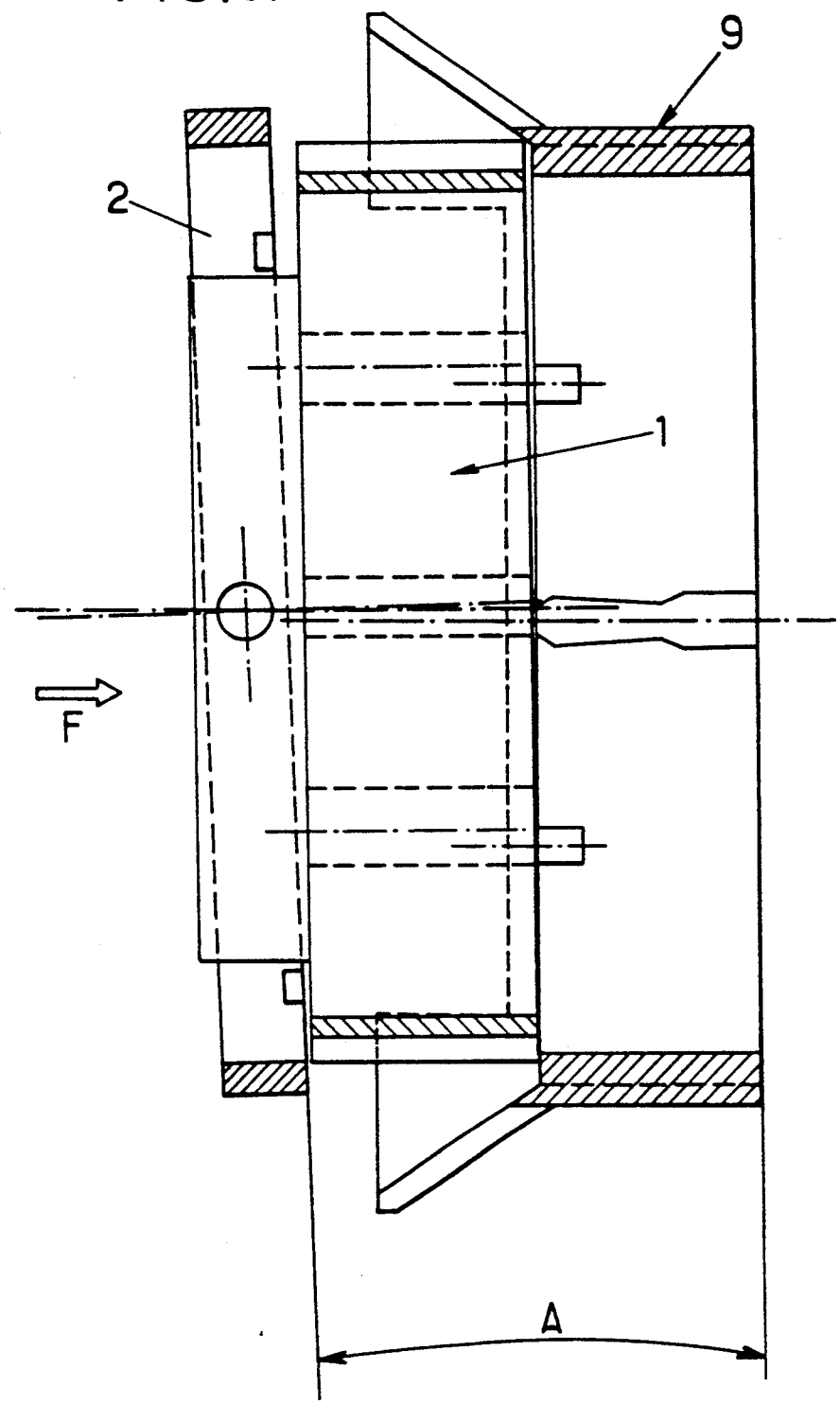

As the male and female portions 1 and 9 move towards each other (arrow F), the male portion 1 comes into engagement against the flared skirt 10. Because of the shape and/or the inclination of the skirt 10, the male portion 1 is tilted relative to its support 2 while simultaneously sliding over the face of said skirt, said combined movements bringing the male portion 1 to the vicinity of the orifice in the female portion 9 in a position that is approximately centered relative thereto (FIGS. 7 and 8). Sliding of the male portion 1 over the flared skirt 10 may be facilitated by making their respective contacting parts out of a material that has a low coefficient of friction (not shown) or by coating them with such a material.

At this stage, the inclination of the male portion 1 relative to the female portion may be such as to enable it to begin penetrating into the female portion 1 even though it is not accurately centered relative thereto. However the keys 16 are not in coincidence with the grooves 7 and they prevent penetration of the male portion.

Figure 9:
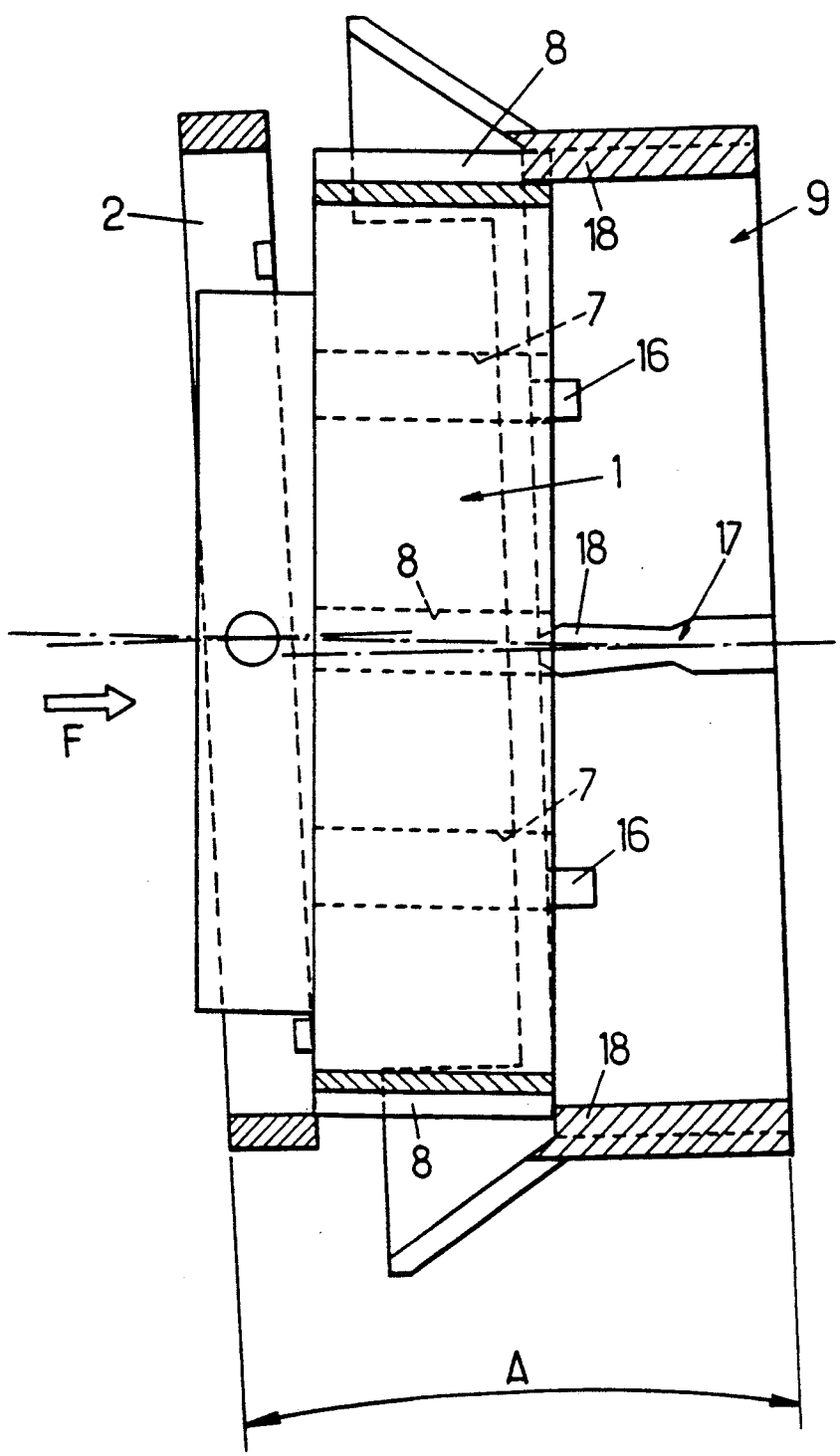
FIG. 9 is a side view in section showing the beginning of the male portion being prealigned in the female portion.
Figure 10:
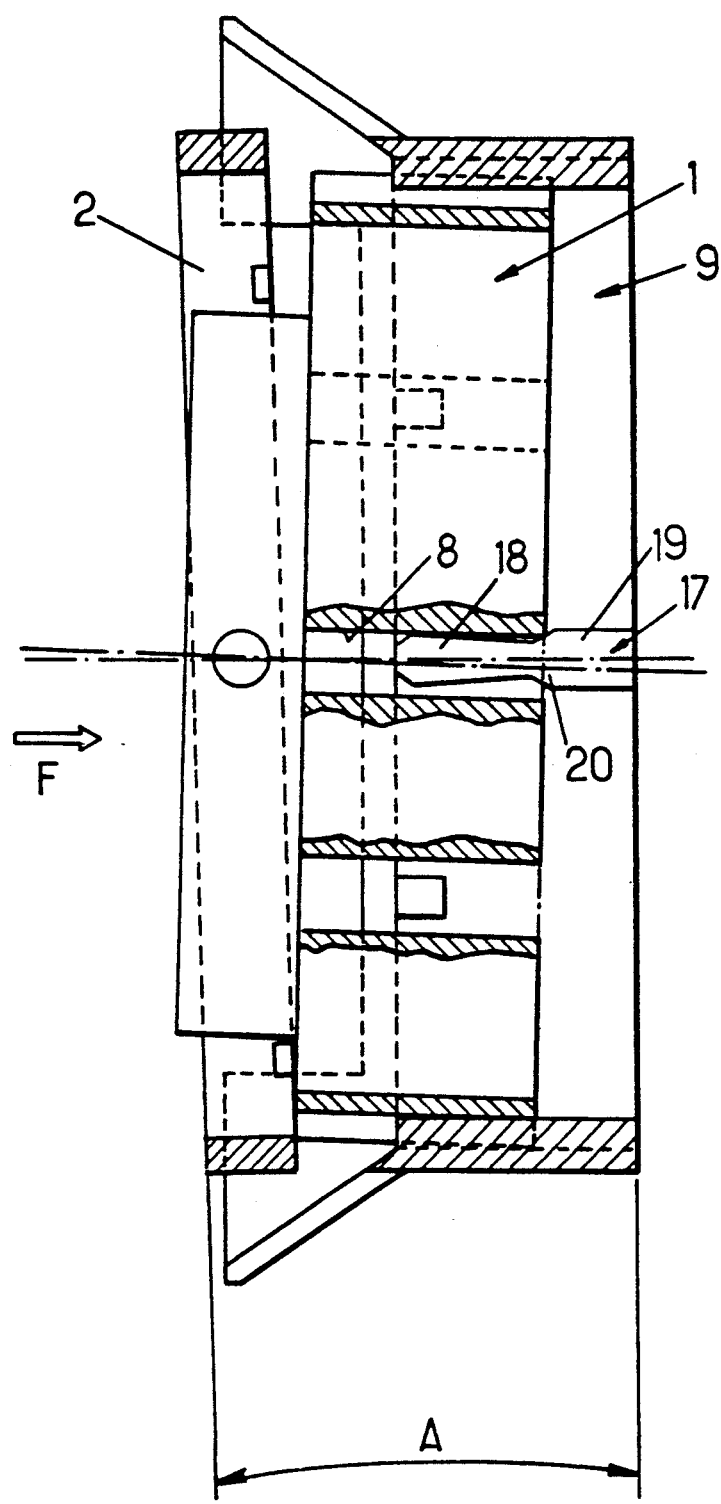
FIG. 10 is a side view in section showing the beginning of the male portion being finely aligned in the female portion.
Figure 11:
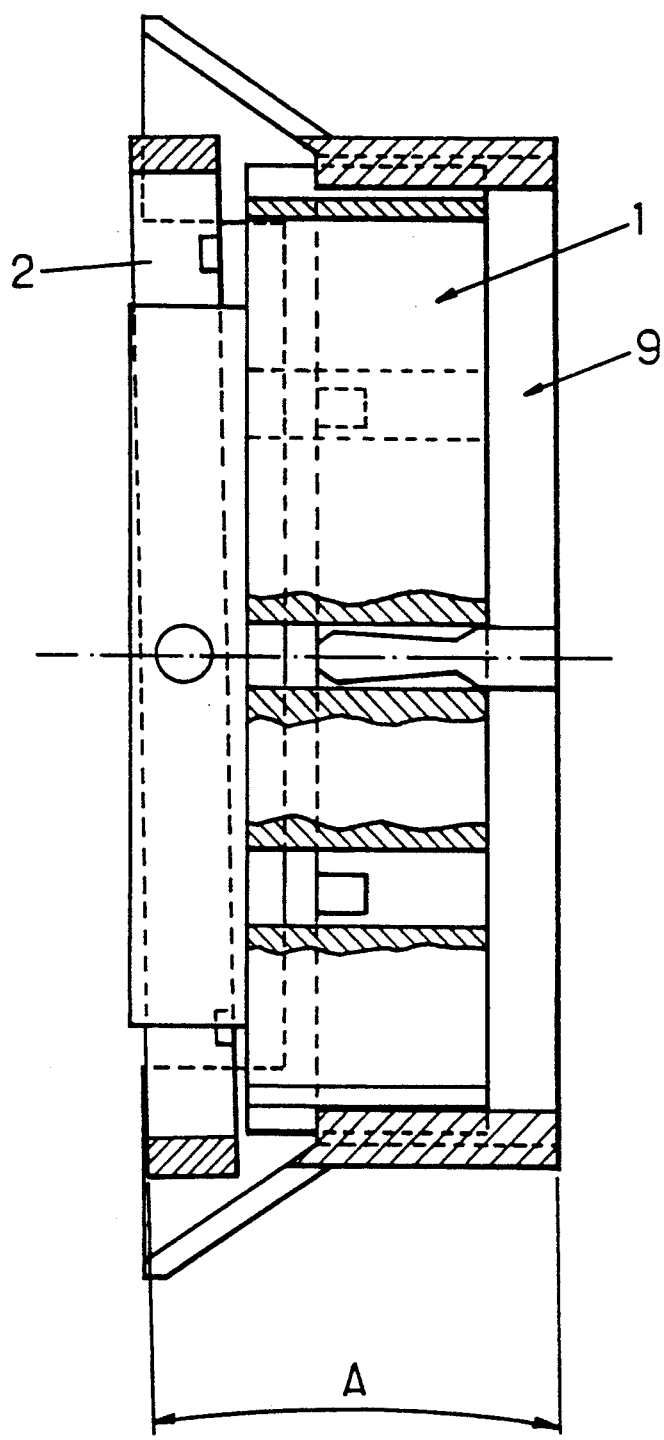
FIG. 11 is a side view in section showing the end of the male portion being finely aligned in the female portion.

Finally, the male portion 1, still guided by the flared skirt 10, ends up by coming into coincidence with the opening of the second skirt 12 of the female portion 9, such that the grooves 7 of the male portion coincide with the keys 16 of the skirt 12. The portions are thus prealigned and the male portion can then penetrate into the female portion (FIG. 9).

At this stage, the front ends 18 of the alignment keys 17 may also be engaged in the alignment grooves 8 and, because they are narrow compared with the grooves, they may also contribute to achieving prealignment.

As the movement continues, the alignment grooves 8 slide onto the cams 20 of the alignment keys 17 (FIG. 10), thereby achieving fine alignment of the male portion relative to the female portion.

With the two portions 1 and 9 now accurately parallel, it is possible to finish off coupling thereof (FIG. 11) even though the support 2 continues to be inclined (A) relative to the plane of the support for the female portion 9.

At this stage it is possible to start establishing the desired connections, which is done by continuing along an additional stroke (not shown).

Naturally, and as can be seen from the above description, the invention is not limited in any way to the applications and embodiments described in greater detail above. On the contrary, the invention extends to any variant.

In particular, it may be observed that the male portion and/or the female portion of the connector may be provided with a floating mount on its respective support, and that the degrees of freedom in translation and in rotation may all be associated with one or other of them or else they may be shared between them.

In addition, in the above description of the preferred embodiment of the invention, provision is made for the female portion to be fitted with a flared skirt that extends forwards.

However, the same function can be given to the male portion which, for this purpose, may be provided with sloping walls that converge in the forwards direction and that are suitable for co-operating with the edges of (non-sloping) walls of the female portion. It is thus appropriate for one of the two portions to have inclined surfaces, flared if it is the female portion or converging if it is the male portion.

We claim:

1. A connector of polygonal section, the connector comprising a first or male connector portion (1) and a second or female connector portion (9), which portions can be releasably coupled to each other to establish a continuous link; said male and female portions being supported by respective supports, with at least one of said connector portions connected to its support via a floating mount; the connector portions being capable of being coupled together by moving their respective supports along a direction approximately parallel to the coupling direction of the two portions, and the female portion and/or the male portion being provided with alignment means (7, 16; 8, 17) for aligning the male portion in the female portion; one of the connector portions being fitted with centering means for centering it relative to the other portion, which means are suitable for prepositioning said portion even if it is presented with an offset and/or with an inclination relative to the other portion;

characterized in that said alignment means comprise prealignment means for prealigning the male portion in the female portion and comprising a skirt (12) which is polygonal in section and which is designed to receive the male portion precentered by said centering means, said skirt (12) and the male portion (1) being fitted with complementary prealignment reliefs (7, 16) for prealigning the male portion in said skirt (12).

2. A connector according to claim 1, characterized in that the corners (6, 15) of the male portion and of the female portion are rounded.

3. A connector according to claim 1, characterized in that one and/or the other of the connector portions is/are mounted on the corresponding support in floating manner so that together they present at least two degrees of freedom in translation and at least two degrees of freedom in rotation relative to their supports.

4. A connector according to claim 1, characterized in that the co-operating portions of the inclined surface of one of the connector portions and of the other connector portions are constituted by a material having a low coefficient of friction, or are coated with such a material.

5. A connector according to claim 1, characterized in that the complementary prealignment reliefs (7, 16) are provided on co-operating faces of the skirt (12) and of the male portion, and comprise keys (16) and grooves (7) of complementary shapes.

6. A connector according to claim 5, characterized in that the complementary prealignment and guidance reliefs are provided on the co-operating large faces (13, 4) of the skirt (12) and of the male portion, which are of rectangular section.

7. A connector according to claim 1, characterized in that the said alignment means further comprise fine alignment means for fine alignment of the male portion in the female portion and including, downstream from the complementary prealignment reliefs, complementary fine alignment guidance reliefs for fine alignment of the male portion in said skirt (12).

8. A connector according to claim 7, characterized in that said complementary fine alignment guidance reliefs are provided on co-operating faces of the skirt (12) and of the male portion and comprise keys (17) and grooves (8) of complementary shapes, the keys or the grooves having a profile that varies axially to include at least one ramp suitable for passing from prealignment guidance to fine alignment guidance of the male portion in the female portion.

9. A connector according to claim 8, characterized in that the fine alignment guidance reliefs are provided on all of the co-operating faces (13, 14; 4, 5) of the skirt (12) and of the male portion.

10. A connector according to claim 1, further characterized in that the female portion (9) is fitted with said means for centering the male portion (1) which comprise another skirt (10) that flares forwards having an axial profile suitable for prepositioning said male portion, even when presented with an offset and/or with an inclination relative to the female portion.

11. A connector according to claim 10, characterized in that the flared skirt (10) is discontinuous and is constituted by lengths (11) of flared skirt situated in the corners of the female portion.

12. A connector according to claim 11, characterized in that the male and female portions are rectangular in section and in that each of the lengths (11) of flared skirt extends over an angle of about 90°.

* * * * *